United States Patent
Palanca et al.

(10) Patent No.: US 6,643,745 B1
(45) Date of Patent: *Nov. 4, 2003

(54) METHOD AND APPARATUS FOR PREFETCHING DATA INTO CACHE

(75) Inventors: Salvador Palanca, Folsom, CA (US); Niranjan L. Cooray, Folsom, CA (US); Angad Narang, Rancho Cordova, CA (US); Vladimir Pentkovski, Folsom, CA (US); Steve Tsai, Rancho Cordova, CA (US); Subramaniam Maiyuran, Fair Oaks, CA (US); Jagannath Keshava, Folsom, CA (US); Hsien-Hsin Lee, El Dorado Hills, CA (US); Steve Spangler, El Dorado Hills, CA (US); Suresh Kuttuva, Folsom, CA (US); Praveen Mosur, Folsom, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 65 days.

(21) Appl. No.: 09/053,383

(22) Filed: Mar. 31, 1998

(51) Int. Cl.[7] ............................................. G06F 12/00
(52) U.S. Cl. .................................. 711/138; 711/137
(58) Field of Search ................................ 711/138, 137, 711/139; 712/207

(56) References Cited

U.S. PATENT DOCUMENTS

| | | | | |
|---|---|---|---|---|
| 3,909,790 A | * | 9/1975 | Shapiro et al. | 710/36 |
| 5,355,467 A | * | 10/1994 | MacWilliams et al. | 711/146 |
| 5,361,391 A | * | 11/1994 | Westberg | 711/137 |
| 5,732,242 A | * | 3/1998 | Mowry | 711/136 |
| 5,751,996 A | * | 5/1998 | Glew et al. | 711/139 |
| 5,758,119 A | * | 5/1998 | Mayfield et al. | 711/137 |
| 5,809,320 A | * | 9/1998 | Jain et al. | 712/34 |
| 5,829,025 A | * | 10/1998 | Mittal | 711/137 |

OTHER PUBLICATIONS

21164 Alpha Microprocessor Data Sheet, 1997 Samsung electronics, p. 67.*
T. C. Mowry, "Tolerating Latency Through Software–Controlled Data Prefetching," Ph.D. thesis, Department of Electrical Engineering, Stanford University, Mar. 1994, pp. 90–91, and 121–193. [Online] http://suif.stanford.edu/papers/.*
21164 Alpha Microprocessor Data Sheet, 1997 Samsung Electronics, pp. 1, 50–51, 55–59, 63–77.
TM1000 Preliminary Data Book, (Tri Media), 1997, Philips Electronics .
Visual Instruction Set (VIS) User's Guide, Sun Microsystems, version 1.1, Mar. 1997, pp. 1–30, 41–127.
AMD–3D Technology manual, /Rev. B, Feb. 1998, pp. 1–58.
The UltraSPARC Processor—Technology White Paper The UltraSPARC Architecture, Sun Microsystems, Jul. 17, 1997, pp. 1–10.

* cited by examiner

Primary Examiner—Matthew Kim
Assistant Examiner—Woo H. Choi
(74) Attorney, Agent, or Firm—Blakely, Sokoloff, Taylor & Zafman LLP

(57) ABSTRACT

A computer system is disclosed. The computer system includes a higher level cache, a lower level cache, a decoder to decode instructions, and a circuit coupled to the decoder. In one embodiment, the circuit, in response to a single decoded instruction, retrieves data from external memory and bypasses the lower level cache upon a higher level cache miss. In another embodiment, the circuit, in response to a first decoded instruction, issues a request to retrieve data at an address from external memory to place said data only in the lower level cache, detects a second cacheable decoded instruction to said address, and places said data in the higher level cache.

20 Claims, 11 Drawing Sheets

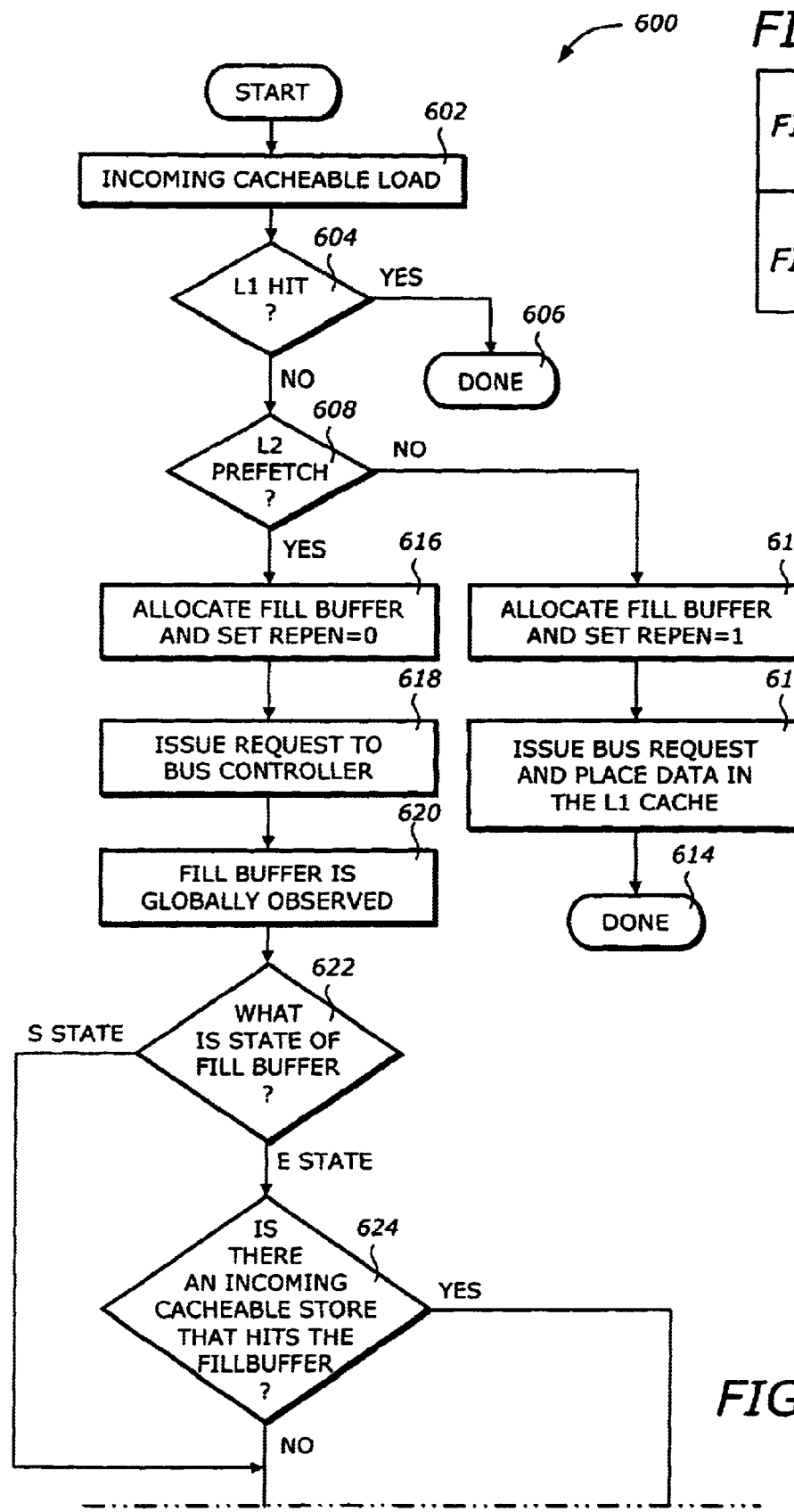

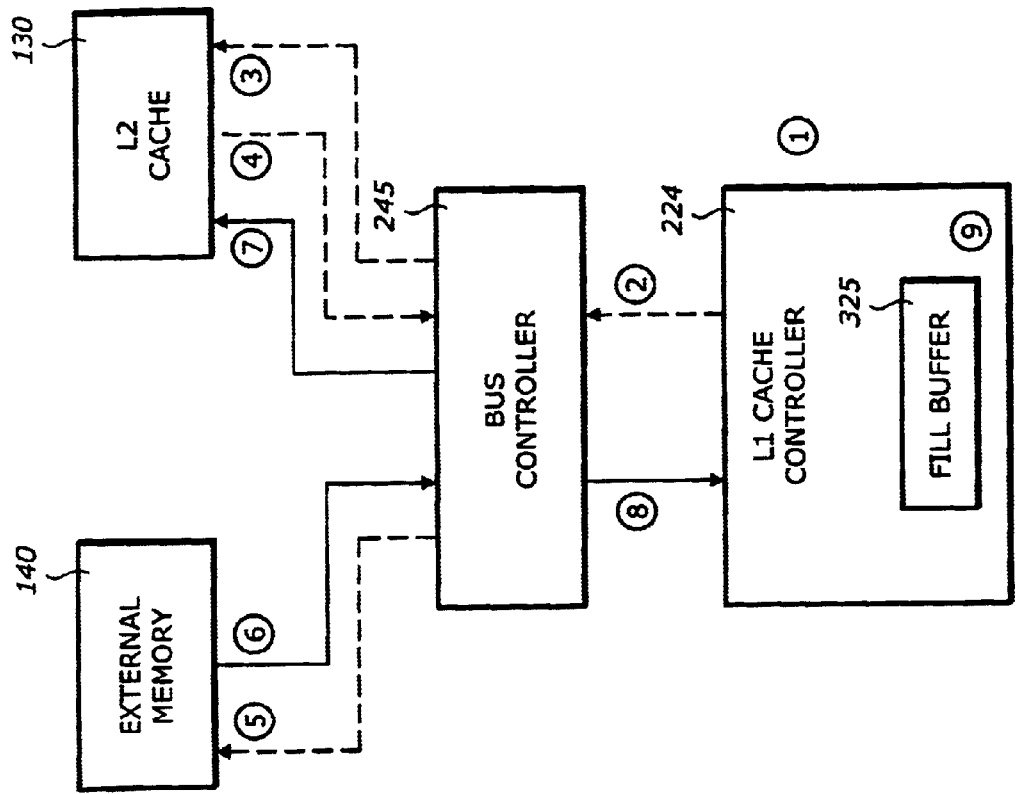
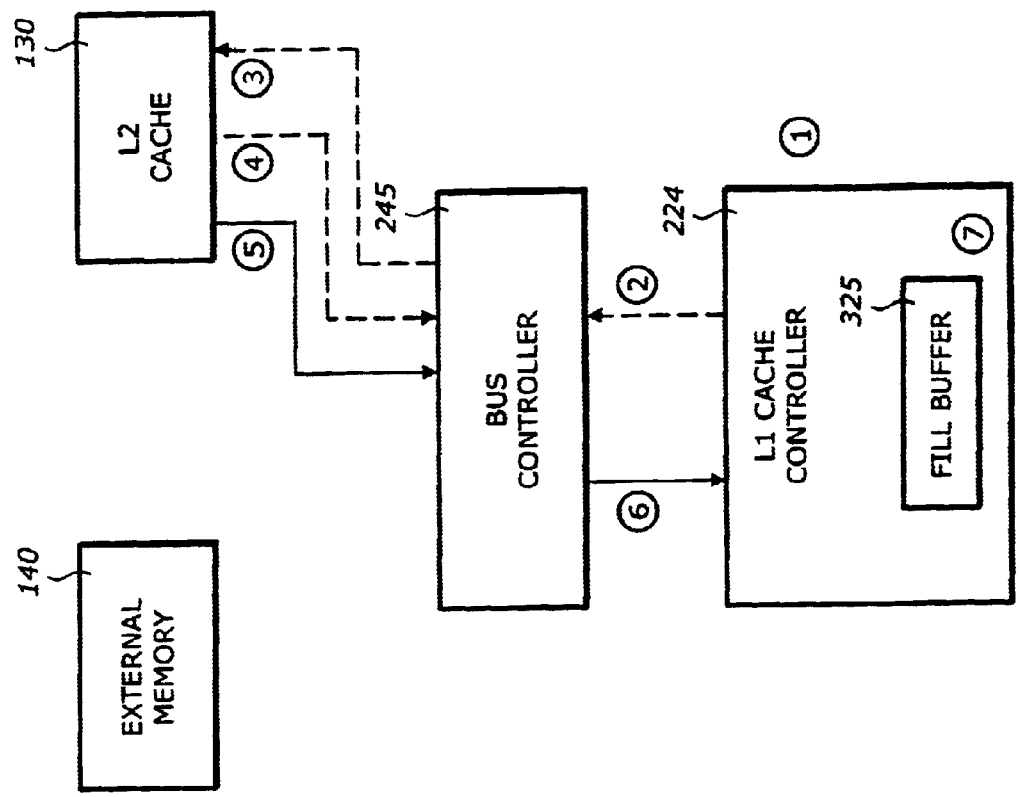
FIG. 9B
FIG. 9A

US 6,643,745 B1

METHOD AND APPARATUS FOR PREFETCHING DATA INTO CACHE

BACKGROUND OF THE INVENTION

1. Field of the Invention

The present invention relates generally to the field of processors, and specifically, to a method and microarchitectural apparatus for prefetching data into cache.

2. Background Information

The use of a cache memory with a processor is well known in the computer art. A primary purpose of utilizing cache memory is to bring the data closer to the processor in order for the processor to operate on that data. It is generally understood that memory devices closer to the processor operate faster than memory devices farther away on the data path from the processor. However, there is a cost trade-off in utilizing faster memory devices. The faster the data access, the higher the cost to store a bit of data. Accordingly, a cache memory tends to be much smaller in storage capacity than main memory, but is faster in accessing the data.

A computer system may utilize one or more levels of cache memory. Allocation and de-allocation schemes implemented for the cache for various known computer systems are generally similar in practice. That is, data that is required by the processor is cached in the cache memory (or memories). If a cache miss occurs, then an allocation is made at the entry indexed by the access. The access can be for loading data to the processor or storing data from the processor to memory. The cached information is retained by the cache memory until it is no longer needed, made invalid or replaced by other data, in which instances the cache entry is de-allocated.

In a computer system having multiple levels of cache, the processor typically checks in a next lower level (e.g., a second level) cache for data on a load "miss" to a higher level (e.g., a first level) cache. If the data is not in the lowest level cache, then the data is retrieved from external memory. This "daisy-chain" or "serial" data lookup mechanism decreases system performance (by wasting clock cycles) if it is known or there is a high likelihood that the data is not in the lower level(s) of the cache.

Accordingly, there is a need in the technology for a method and apparatus to allow the flexibility to retrieve data from external memory and bypass the second level cache upon first level cache "miss".

It is further desirable to provide a method and apparatus to place the data in a first level cache while prefetching data exclusively into a second level cache, based on external conditions.

SUMMARY OF THE INVENTION

In one embodiment, the present invention is a computer system. The computer system includes a higher level cache, a lower level cache, a decoder to decode instructions, and a circuit coupled to the decoder. In one embodiment, the circuit, in response to a single decoded instruction, retrieves data from external memory and bypasses the lower level cache upon a higher level cache miss.

BRIEF DESCRIPTION OF THE DRAWINGS

The features and advantages of the present invention will become apparent from the following detailed description of the present invention in which:

FIG. 6, comprising FIGS. 6A and 6B, is a flow chart illustrating an exemplary process of modifying a replace enable bit on a fill buffer which is servicing a L2 cacheable prefetch "miss", according to one embodiment of the invention.

FIG. 9A illustrates an exemplary data flow for a L2 cacheable prefetch that "misses" the L1 cache and "hits" the L2 cache.

FIG. 9B illustrates an exemplary data flow for a L2 cacheable prefetch that "misses" both the L1 and L2 caches, according to one embodiment of the invention.

DETAILED DESCRIPTION

The present invention is a method and apparatus for prefetching data into cache. In the following description, for purposes of explanation, numerous details are set forth in order to provide a thorough understanding of the present invention. However, it will be apparent to one skilled in the art that these specific details are not required in order to practice the present invention.

As hereinafter described, non-temporal data refers to data that is intended to be used once or at most a few times by the processor whereas temporal data is data that is intended to be used more than non-temporal data (e.g., used repeatedly). A cache "hit" occurs when the address of an incoming instruction matches one of the valid entries in the cache. For example, in the MESI protocol, a line in the cache has a valid entry when it is in modified "M", exclusive "E", or shared "S" state. A cache "miss" occurs the address of an incoming instruction does not match any valid entries in the cache. For sake of clarity, the cache is described with respect to the MESI protocol, however, any other protocol or cache consistency model may be used.

Figure 1:
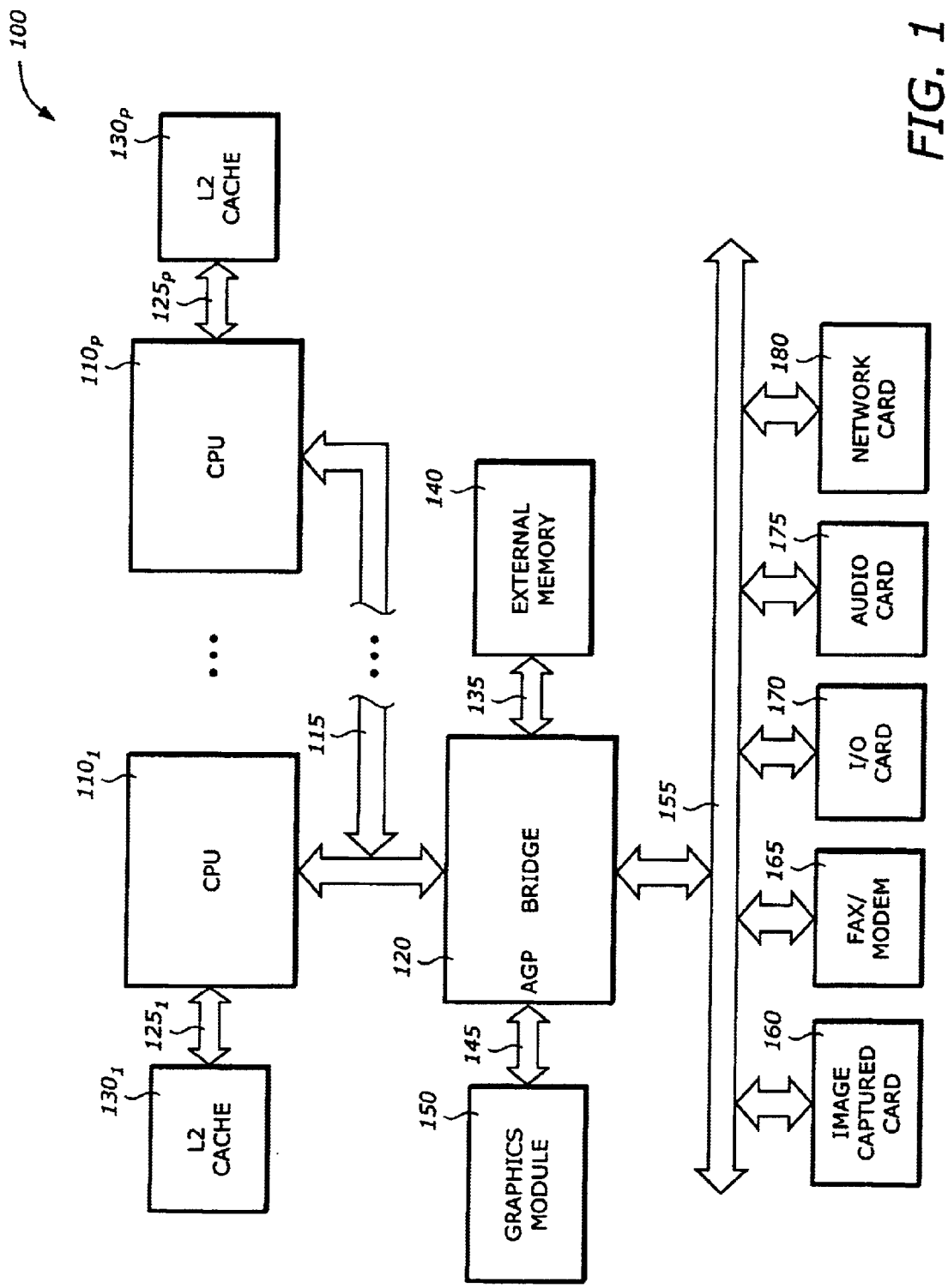
FIG. 1 illustrates an exemplary embodiment of a computer system in accordance with the teachings of the present invention.

FIG. 1 illustrates an exemplary embodiment of a computer system 100. Referring to FIG. 1, computer system 100 comprises one or more central processing units ("CPUs") $110_1$–$110_P$ (where P is a positive whole number), coupled to a bridge 120 by way of a host bus 115. Each CPU 110 is also coupled to a Level 2 ("L2") cache 130 by way of a backside bus 125. Each CPU 110 may be of any type, such as a complex instruction set computer ("CISC"), reduced instruction set computer ("RISC"), very long instruction word ("VLIW"), or hybrid architecture. In addition, each CPU 110 could be implemented on one or more chips. Through an AGP port, the bridge 120 is coupled to a graphics module 150 by way of a graphics bus 145. The bridge is also coupled to external memory 140 (e.g., static random access memory "SRAM", dynamic RAM "DRAM", etc.) by way of an external bus 135 and an expansion bus 155. In one embodiment, the expansion bus 155 is, for example, a peripheral component interconnect ("PCI") bus, an Extended Industry Standard Architecture ("EISA") bus, or a combination of such busses. Of course, different bus configurations can be used.

A number of peripheral devices may optionally be coupled to the system, including an image capture card 160, fax/modem card 165, input/output ("I/O") card 170, audio card 175, network card 180, and the like. The image capture card 160 represents one or more devices for digitizing images (i.e., a scanner, camera, etc.). The fax/modem 165 represents a fax and/or modem for receiving and/or transmitting analog signals representing data. The audio card 175 represents one or more devices for inputting and/or outputting sound (e.g., microphones, speakers, etc.). The network card 180 represents one or more network connections (e.g., an Ethernet connection).

Figure 2:
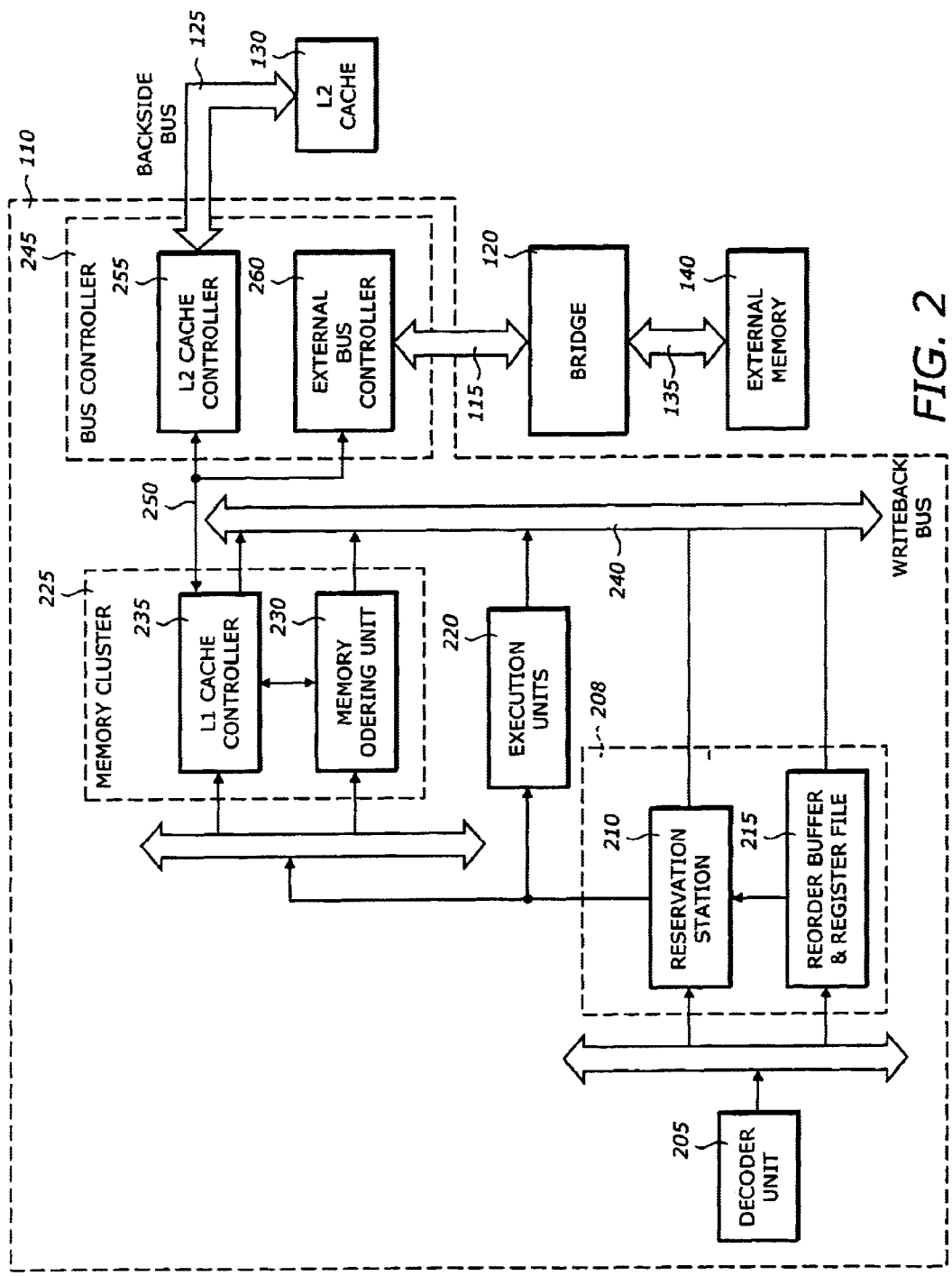
FIG. 2 illustrates exemplary structures of the CPU implementing a multiple cache arrangement, according to one embodiment of the invention.

FIG. 2 illustrates exemplary structures of the CPU 110 implementing a multiple cache arrangement. Referring to FIG. 2, the CPU 110 includes, among other things, a decoder unit 205, a processor core 208, execution units 220, a memory cluster 225 having a memory ordering unit ("MOU") 230 and a Level 1 ("L1") cache controller 235, and a bus controller 245 having a L2 cache controller 255 and an external bus controller 260. In one embodiment, the CPU 110 is an out-of-order processor, in which case the processor core 208 includes a reservation station 210 and a logical block having a reorder buffer and a register file 215. It is to be noted that there are other well known or new out-of-order execution architectures. However, in another embodiment, the CPU 110 is an in-order processor, in which case the reservation station 210 and/or the reorder buffer may not be needed. In either case, the present invention operates with any type of processor (e.g., out-of-order, in-order, etc.). For clarity sake, all references made to the reorder buffer and/or the register file will be designated by numeral 215, even though they are separate logical units within the logical block 215. The register file 215 includes a plurality of general purpose registers. It is to be appreciated that the CPU 110 actually includes many more components than just the components shown. Thus, only those structures useful to the understanding of the present invention are shown in FIG. 2.

The decoder unit 205 decodes instructions and forwards them to the reservation station 210 and the reorder buffer 215 of the processor core 208. The processor core 208 is coupled to the memory cluster 225 and the execution units 220 for dispatching instructions to the same. The memory cluster 225 writes back information to the processor core 208 by way of a writeback bus 240. The L1 cache controller 235 is coupled to the L2 cache controller 255 and the external bus controller by way of a bus 250. The L2 cache controller 255 controls the L2 cache 130, and the external bus controller 260 interfaces with the external memory 140 through the bridge 120.

Figure 3:
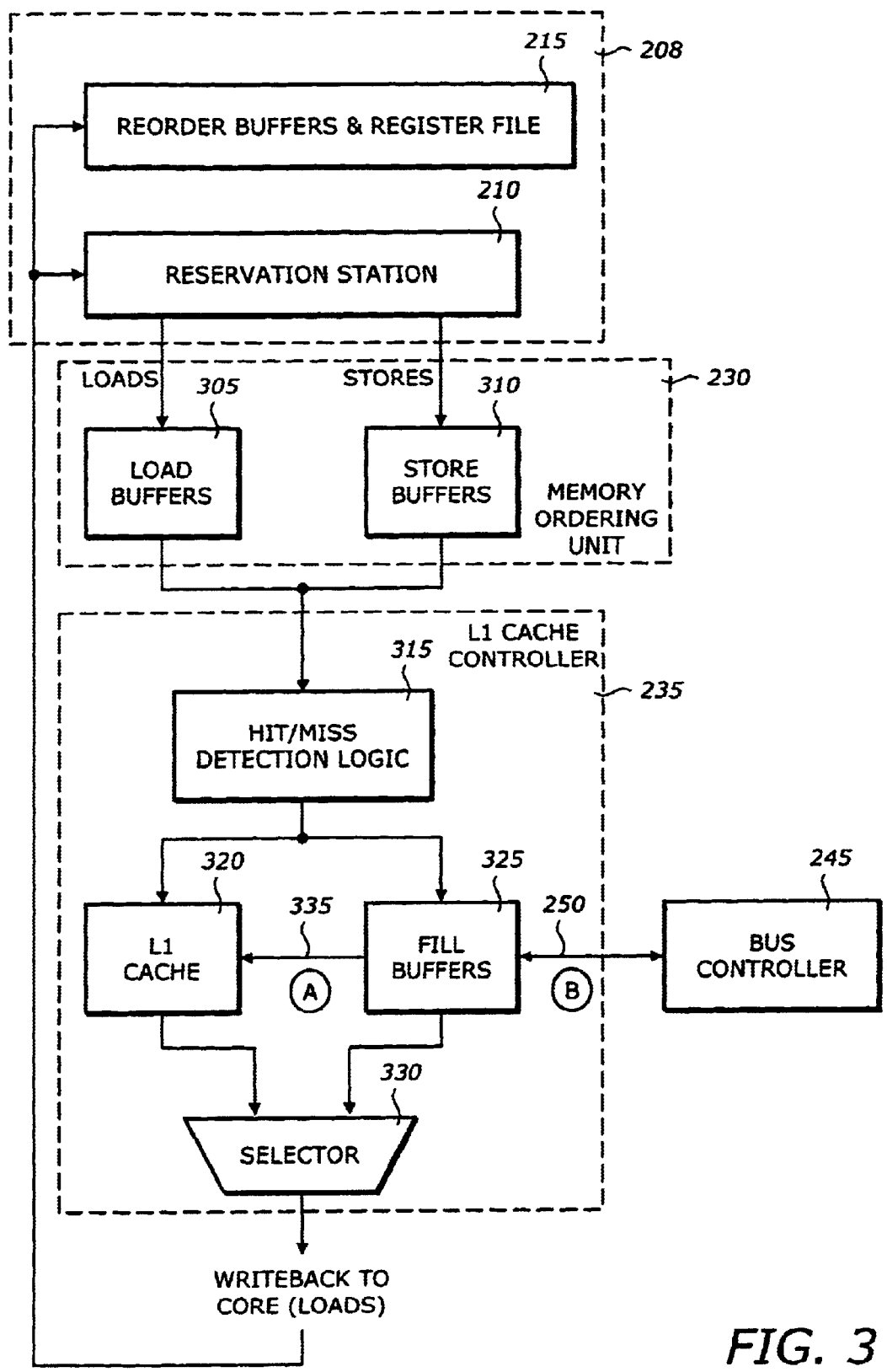
FIG. 3 illustrates exemplary logical structures of the memory ordering unit and the L1 cache controller and the interconnection therebetween, according to one embodiment of the invention.

FIG. 3 illustrates exemplary logical units of the memory ordering unit 230 and the L1 cache controller 235 and the interconnection therebetween. Referring to FIG. 3, the MOU 230 includes, among other things, a load buffer 305 which buffers a plurality (e.g., 16 entries) of load (or read) requests and a store buffer 310 which buffers a plurality (e.g., 12 entries) of store (or write) requests. Alternatively, the MOU 230 may use a single unified buffer which buffers both load and store instructions. The addresses of the load and store instructions are transmitted to, among other things, a hit/miss detection logic 315 of the L1 cache controller 235. The hit/miss detection logic 315 is coupled to a L1 cache 320 and a plurality of L1 cache controller buffers 325 (hereinafter referred to as "fill buffer(s)"). The hit/miss detection logic 315 determines whether the incoming instructions "hit" either the L1 cache 320 or the fill buffers 325 (e.g., performs an address comparison).

The L1 cache 320 and the fill buffers 325 (e.g., four buffers) are coupled to a selector 330 (e.g., a multiplexer) for returning load request data back to the reservation station 210 and/or the reorder buffer and register file 215 of the processor core 208. The fill buffers 325 are also coupled to the L1 cache 320 by way of path A (bus 335) and the bus controller 245 by way of path B (bus 250).

Referring to FIGS. 2 and 3, two separate cache memories 320 and 130 are shown. The caches memories 320 and 130 are arranged serially and each is representative of a cache level, referred to as L1 cache and L2 cache, respectively. Furthermore, the L1 cache 320 is shown as part of the CPU 110, while the L2 cache 130 is shown external to the CPU 110. This structure exemplifies the current practice of placing the L1 cache on the processor chip while higher level caches are placed external to it. The actual placement of the various cache memories is a design choice or dictated by the processor architecture. Thus, it is appreciated that the L1 cache 320 could be placed external to the CPU 110. The caches can be used to cache data, instructions or both. In some systems, the L1 cache is actually split into two sections, one section for caching data and one section for caching instructions. However, for simplicity of explanation, the various caches described in the Figures are shown as single caches with data.

As noted, only two caches 320 and 130 are shown. However, the computer system need not be limited to only two levels of cache. It is now a practice to utilize a third level ("L3") cache in more advanced systems. It is also the practice to have a serial arrangement of cache memories so that data cached in the L1 cache is also cached in the L2 cache. If there happens to be a L3 cache, then data cached in the L2 cache is typically cached in the L3 cache as well. Thus, data cached at a particular cache level is also cached at all higher levels of the cache hierarchy.

As shown in FIG. 1, the computer system 100 may include more than one CPU, typically coupled to the system by way of bus 115. In such a system, it is typical for multiple CPUs to share the external memory 140. For example, with the system of FIG. 1, the L1 and L2 caches 320 and 130 of each CPU would be utilized by its processor only. The present invention can be practiced in a single CPU computer system or in a multiple CPU computer system. It is further noted that other types of units (other than processors) which access external memory can function equivalently to the CPUs described herein and, therefore, are capable of performing the memory accessing functions similar to the described CPUs. For example, direct memory accessing ("DMA") devices can readily access memory similar to the processors described herein. Thus, a computer system having one CPU, but one or more of the memory accessing units would function equivalent to the multiple processor system described herein.

EXEMPLARY OPERATION

Generally, the decoder unit 205 fetches instructions from a storage location (such as external memory 140) holding the instructions of a program that will be executed and decodes these instructions. The decoder unit 205 forwards the instructions to the processor core 208. In the embodiment shown, the instructions are forwarded to the reservation station 210 and the reorder buffer 215. The reorder buffer 215 keeps a copy of the instructions in program order. Each entry in the reorder buffer 215, which corresponds to a micro-instruction, includes a control field with one bit being a write-back data valid bit. The write-back data valid bit indicates whether an instruction can been retired. The reorder buffer 215 retires the instruction when the instruction has its write-back data valid bit set and when all previous instructions in the reorder buffer have been retired (i.e., in-order retirement). The reservation station 210 receives the instructions and determines their type (e.g., arithmetic logic unit "ALU" instruction, memory instruction, etc.). In one embodiment, the reservation station 210 dispatches instructions in an out of order manner, i.e., a M-th sequential instruction in a program may be executed before a (M-N)-th sequential instruction (where M and N are positive whole numbers and M>N).

For example, for an ALU instruction, the reservation station 210 dispatches the instruction to the execution units 220. The execution units 220 execute the instruction and return the result back to the reorder buffer and the register file 215 so that the result can be written to a register in the register file and the instruction can be retired. Memory instructions are dispatched to the MOU 230. Load instructions are placed in the load buffer 305 while store instructions are placed in the store buffer 310. The MOU 230 will throttle the processor core 208 and not accept an instruction if the buffer that the instruction is destined for (e.g., load or store buffer) is full, if there is an abort condition, or on other conditions.

The MOU 230 dispatches instructions (load, store, etc.) to the L1 cache controller 235. Generally, in certain situations the MOU 230 may dispatch instructions out of order. For example, if instruction two is dependent on instruction one and instruction three is independent of both instructions one and two, instruction two has to wait until the result of instruction one is available but instruction three can go ahead since it has no dependencies. Therefore, the MOU 22 may dispatch instruction one, then instruction three, and then instruction two.

For sake of clarity and illustration of the present invention, the operation of the L1 cache controller 235 and the rest of the computer system will be described with respect to load instructions. The L1 cache controller 235 determines, among other things, whether (i) the request is cacheable, (ii) the instruction is a load or a store, and (iii) the data to be read is in the L1 cache 320 or fill buffer 325. The last determination is made by the hit/miss detection logic 315. A request is uncacheable if the data to be retrieved is, for example, located in memory-mapped I/O. Cacheable requests load data in the caches. If the data to be loaded is contained in the L1 cache 320 and the request is cacheable, a read "hit" occurs and the data is transferred from the L1 cache 320 through the selector 330 and to the reorder buffer and register file 215 by way of the writeback bus 240.

If, on the other hand, the data is not in the L1 cache 320, a read "miss" occurs. In the case of a read "miss", the L1 cache controller 235 allocates one of the plurality of fill buffers 325 for retrieving the data. All requests to the bus controller 245 come from the fill buffers 325. Once allocated, the fill buffer 325 issues a load request to access the bus controller 245 by way of path B (bus 250). When the (cacheable) load request is granted, the bus controller 245 first checks the L2 cache 130 (for most instructions) to determine whether the line of data is contained therein. If the data is in the L2 cache 130, a L2 cache "hit" occurs and the data is transmitted from the L2 cache to the fill buffer 325 that requested the data. If the data is not in the L2 cache 130, a L2 cache "miss" occurs and the bus controller 245 retrieves the data from external memory 140 and sends the data to the fill buffer 325 and the L2 cache 130 (for most instructions). An example where cacheable data is not placed in L2 cache 130 is on a non-temporal prefetch instruction with parallel lookup (described below).

The fill buffer 325 forwards the data to the reorder buffer and register file 215. The fill buffer 325 then forwards the data to the L1 cache 320 by way of path A (bus 335). Alternatively, the bus controller 245 sends the data from a L2 cache "hit" simultaneously to both the fill buffer 325 and the reorder buffer and register file 215 by way of the writeback bus 240 (assuming that the writeback bus is available). If the writeback bus 240 is not available, the fill buffer 325 will send the data to the reorder buffer and register file 215 and then to the L1 cache 320.

Of particular interest to the present invention is the prefetch macro-instruction (hereinafter also referred to as a "prefetch request"). The prefetch instruction retrieves and places data to a specified cache level in anticipation of future use. Prefetch instructions are considered "senior loads" in that their retirement precedes their execution. Senior loads are described in co-pending U.S. patent application Ser. No. 09/053,932 entitled "Method and Apparatus for Senior Loads" by Salvador Palanca et al. and assigned to the assignee of the present invention. The prefetch instruction does not affect the architectural state of the registers in the register file. A feature common to all prefetch instructions is that they may never be executed, depending on the processor implementation. Two cases where prefetch instructions are retired without execution include detection of a mispredicted branch and detection of a nuke condition on a subsequent instruction to the prefetch instruction, after the prefetch instruction has been retired, but not executed. Furthermore, uncacheable prefetch instructions are always ignored and treated as a no operation ("NOP") by the L1 cache controller 235.

In one embodiment, the prefetch instruction prefetches temporal and non-temporal data. Temporal data refers to data that may be used more than once by a program whereas non-temporal data refers to data that will only be used once or a limited number of times and will not be used again. An example of non-temporal data is certain data used in multimedia applications. A prefetch instruction includes a plurality of "hints" as part of the instruction which specifies, among other things, whether the data is temporal or non-temporal data and the target cache level(s). No data movement occurs if the data is already found in a cache level closer to the processor or equal to that specified in the prefetch instruction.

A cacheable non-temporal prefetch instruction brings data to the closest level (e.g., a cache or buffer) to the processor for future use. In one embodiment, cacheable non-temporal prefetch instructions brings data to the L1 cache 320. In another embodiment, cacheable non-temporal prefetch instructions bring data to dedicated buffers in the L1 cache controller 235 (not shown) used exclusively to support non-temporal data. If cacheable non-temporal prefetch instructions bring data to the L1 cache 320, then a biased least recently used ("LRU") algorithm can be used to minimize cache pollution in the L1 cache. The biased LRU algorithm is disclosed in co-pending U.S. patent application Ser. No. 09/053,386 entitle "Shared Cache Structure for Temporal and Non-Temporal Instructions" by Salvador Palanca et al., and assigned to the assignee of the present invention.

Figure 4A:
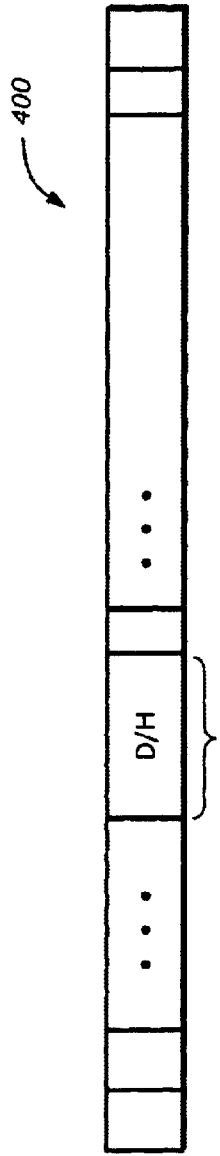
FIG. 4A is an op code illustrating an exemplary prefetch instruction "hints", according to one embodiment of the invention.

FIG. 4A illustrates an exemplary op code 400 for a prefetch instruction. The op code 400 includes a Data/Hints ("D/H") field 410 which includes three bits, although more or less bits may be used. The op code 400 is forwarded from the decoder unit 205 to the L1 cache controller 235. The L1 cache controller 235 includes logic (see, e.g., FIG. 4B) which determines whether an instruction is a prefetch instruction or a non-prefetch instruction. The D/H field 410 has a different meaning for prefetch instructions than for non-prefetch instruction. Table 1 shows the meaning of the D/H field 410 based on the type of instruction.

TABLE 1

| D/H field | Prefetch Instruction Operation | Non-prefetch Instruction Operation |
|---|---|---|
| 000 | — | 1 byte move |
| 001 | non-temporal prefetch | 1 byte move |
| 010 | L1 prefetch | 2 byte move |
| 011 | — | 2 byte move |
| 100 | L2 prefetch | 4 byte move |
| 101 | — | 4 byte move |
| 110 | — | 8 byte move |
| 111 | — | 8 byte move |

For example, for a non-prefetch instruction, a D/H field of "101" indicates a four-byte move instruction (load or store). For a prefetch instruction, a D/H field of "010" indicates a L1 prefetch, i.e., a load to the L1 cache 320.

Figure 4B:
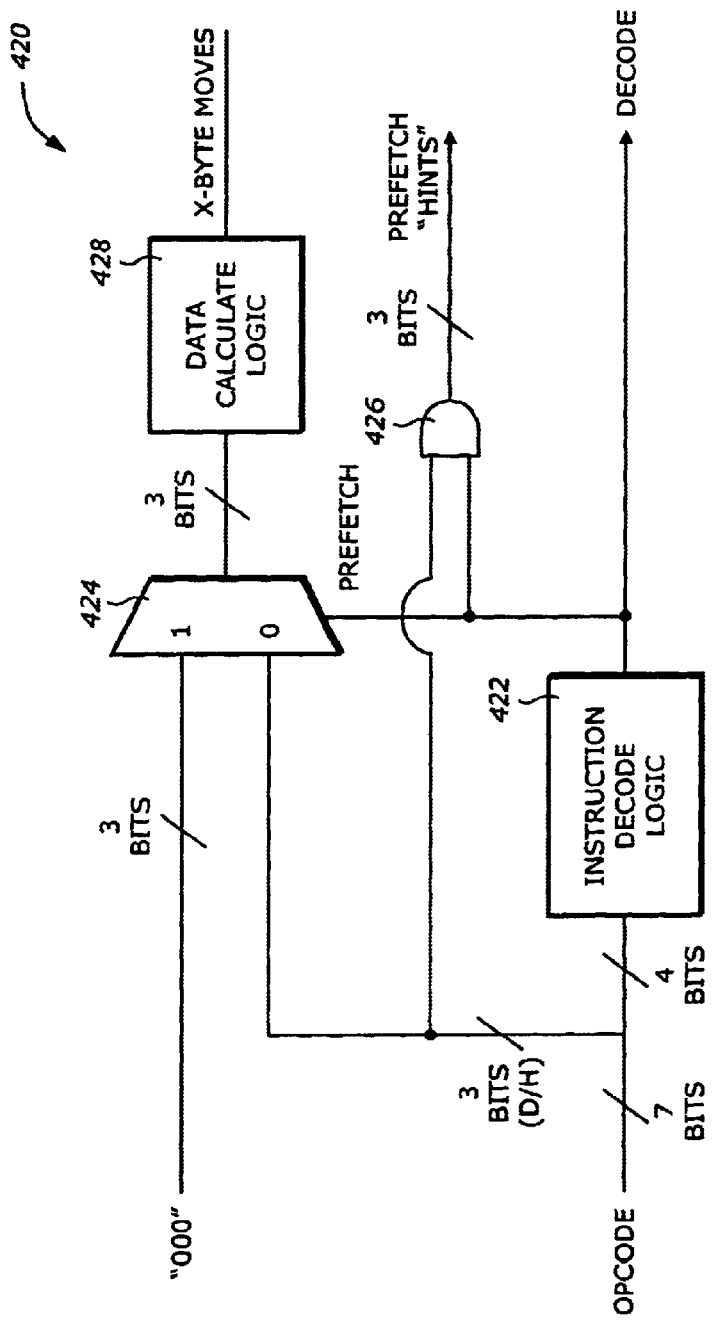
FIG. 4B illustrates an exemplary embodiment of a data calculation and decode logic unit, according to one embodiment of the invention.

FIG. 4B illustrates an exemplary embodiment of a data calculation and instruction decode logic unit 420. Referring to FIG. 4B, the data calculation and instruction decode logic unit 420 receives a seven-bit op code with four bits (non-D/H bits) being fed to an instruction decode logic 422 and three bits (D/H field 410) being fed to one input of multiplexers 424 and AND gates 426. The instruction decode logic 422 determines, among other things, the type of instruction (e.g., load, store, prefetch), whether the instruction is cacheable, etc.

For non-prefetch instructions, the D/H field 410 is forwarded to one input of the multiplexers 424 and to a data calculation logic 428 which determines the byte length of the instructions and generates the appropriate byte enables. For prefetch instructions, the output of the instruction decode logic 422 selects the "000" input of the multiplexers 424 to indicate a one byte move. The output of the multiplexer 424 is coupled to the data calculation logic 428 which selects a one byte move. Moreover, the output of the instruction decode logic 422 allows AND gates 426 to pass the D/H field 410 to the outputs. These outputs determine the prefetch "hints" (e.g., non-temporal prefetch, L1 prefetch, L2 prefetch, etc.) and are used to set/clear control fields in the fill buffer in case of a L1 cache "miss".

In one embodiment, prefetch instructions only retrieve one line of data (32 bytes) to avoid line splits. That is, since a two byte request may require two lines of data if the two bytes fall on different cache lines, the D/H field 410 is masked to a "000" in the data calculation logic 428 to prevent such line splits. Cacheable read requests, such as a prefetch instructions, always bring in a cache line of data from the L2 cache or external memory on a L1 cache "miss", unless the length of the cacheable read request spans across two lines of data. However, this can never happen for prefetch instructions since their length is masked to one byte (i.e., only one line of data is brought in from the bus controller upon a L1 cache "miss"). However, alternative embodiments may allow prefetch instructions to cross cache lines.

Figure 4C:
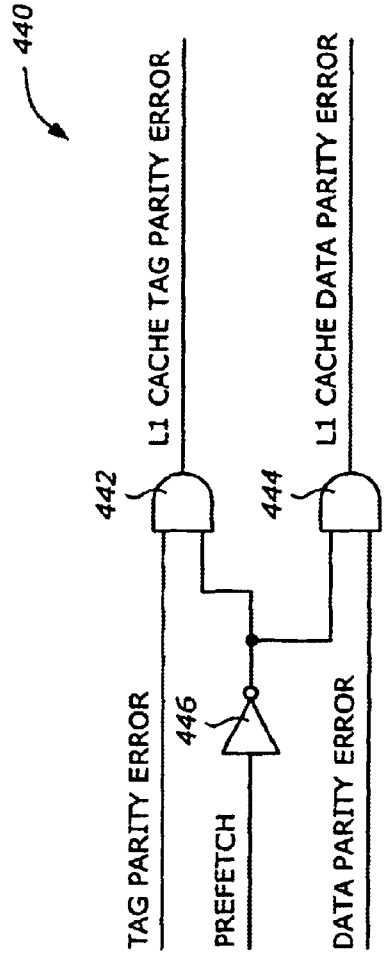
FIG. 4C illustrates an exemplary embodiment of a masking circuit for masking L1 cache data/tag parity errors for prefetch instructions, according to one embodiment of the invention.

Moreover, the L1 cache tag and data parity error signals are masked (i.e., not reported) if caused by a prefetch macro-instruction (i.e., the error signals are logically ANDed with the inverted version of the decoded signal that indicates a prefetch). FIG. 4C illustrates an exemplary embodiment of a masking circuit for masking L1 cache data/tag parity errors for prefetch instructions.

Figure 4D:
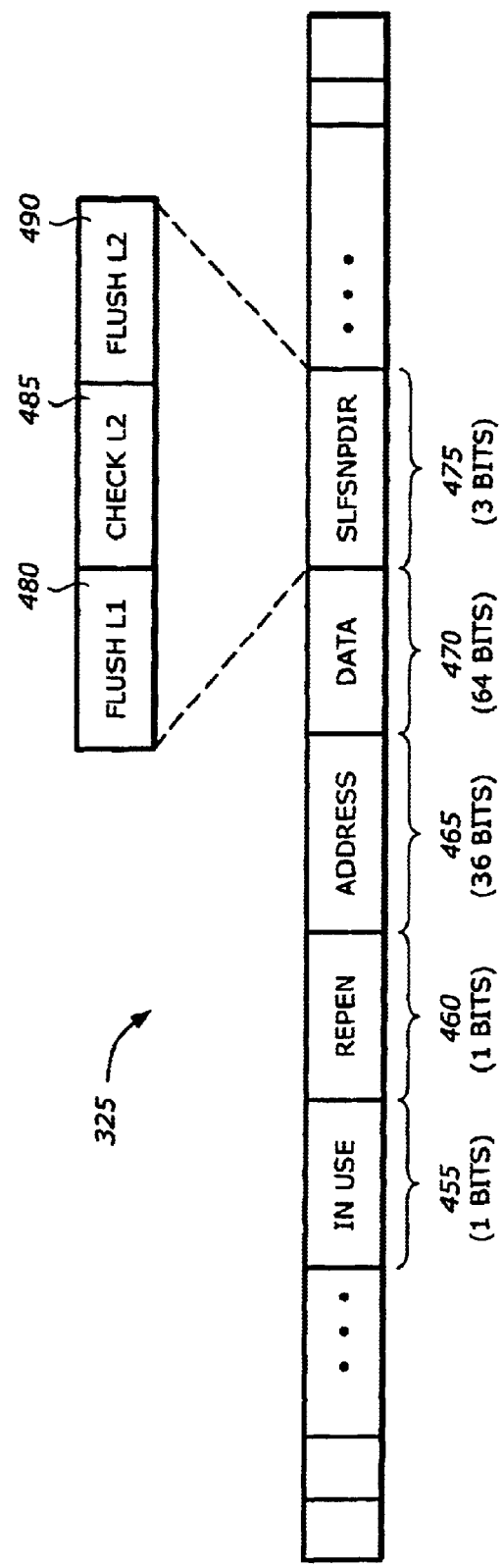
FIG. 4D illustrates an exemplary L1 cache controller buffer that includes various control fields pertinent to the present invention, according to one embodiment of the invention.

The effect of a cacheable non-temporal prefetch miss on a L2 cache is controlled through a mode bit which selects between serial and parallel L2 lookup. FIG. 4D illustrates an exemplary fill buffer 325 that includes various control fields pertinent to the present invention. Referring to FIG. 4D, the fill buffer 325 includes, among other fields, the following control fields: (i) "In Use" control field 455 which is set when the fill buffer 325 is allocated (e.g., on a L1 read "miss") and is cleared when the fill buffer is deallocated (i.e., on a completed transaction); (ii) "RepEn" control field 460 which specifies whether data that is returned from the bus controller 245 is to be written into the L1 cache 320 (i.e., when set, data is placed in the L1 cache); (iii) Address control field 465 which includes the address of the request; (iv) Data control field 470 which includes the data that is returned to the buffer on a load request and contains valid data to be written to the L2 cache or external memory on a store request; and (v) SelfSnpDir control field 475 which includes three control bits, namely, the Flush L1 480, Check L2 485, and Flush L2 490 control bits. Other embodiments could use different fields.

While one embodiment is described with reference to a specific cache protocol (e.g., MESI), other embodiments could use any number of different protocols. In particular, the Flush L1 bit, when set, specifies to the L1 cache controller 235 to invalidate the line of data (if present) in the L1 cache that corresponds to the address in the Address control field 465. However, if the line of data in the L1 cache 320 is in the M state, then the line is first written to external memory 140 and then it is invalidated. If the line is in any other state (e.g., S, E, or I state), then the line is invalidated. Flushing occurs after a request is issued to the bus controller but before receiving/sending data from/to the bus controller. With respect to prefetch instructions, the Check L2 and Flush L2 control bits are mutually exclusive in that they are never both active (e.g., in this embodiment, they are never both set or reset) at the same time. When the Check L2 bit is set (and the Flush L2 bit is reset), the L2 cache is first checked for the line of data requested before external memory is checked (hereinafter referred to as a "serial lookup"). External memory is never checked in a serial lookup if the line of data is in the L2 cache.

Conversely, when the Flush L2 bit is set (and Check L2 bit is reset), external memory is first checked for the line of data requested (hereinafter referred to as a "parallel lookup"). However, in parallel lookup, the L2 cache is still checked to determine if the data is in the L2 cache rather than external memory. If the line of data is in the; L2 cache 130 and in the M state, the data is first written to external memory and then the line in the L2 cache is invalidated. In this case, there is a performance loss because the data would have been retrieved faster if serial lookup was first performed. If the line in the L2 cache is in any other state, the line is invalidated. This case also has a performance loss, although to a lesser degree, since L2 cache access time is faster than external memory access time. For a cacheable non-temporal prefetch "miss", the Flush L1 bit is zero because on a L1 "miss", the data is not in the L1 cache 320 and no flushing is required.

Figure 5B:
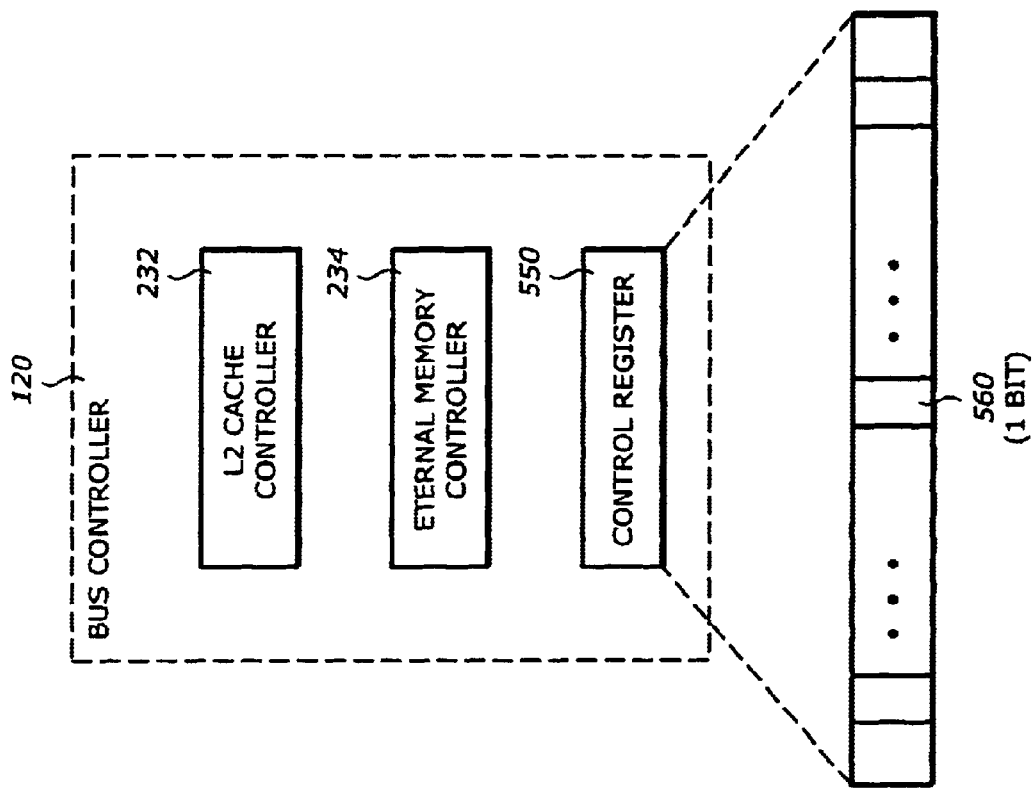
FIG. 5B illustrates a control register in the bus controller which includes a mode bit, according to one embodiment of the invention.
Figure 5A:
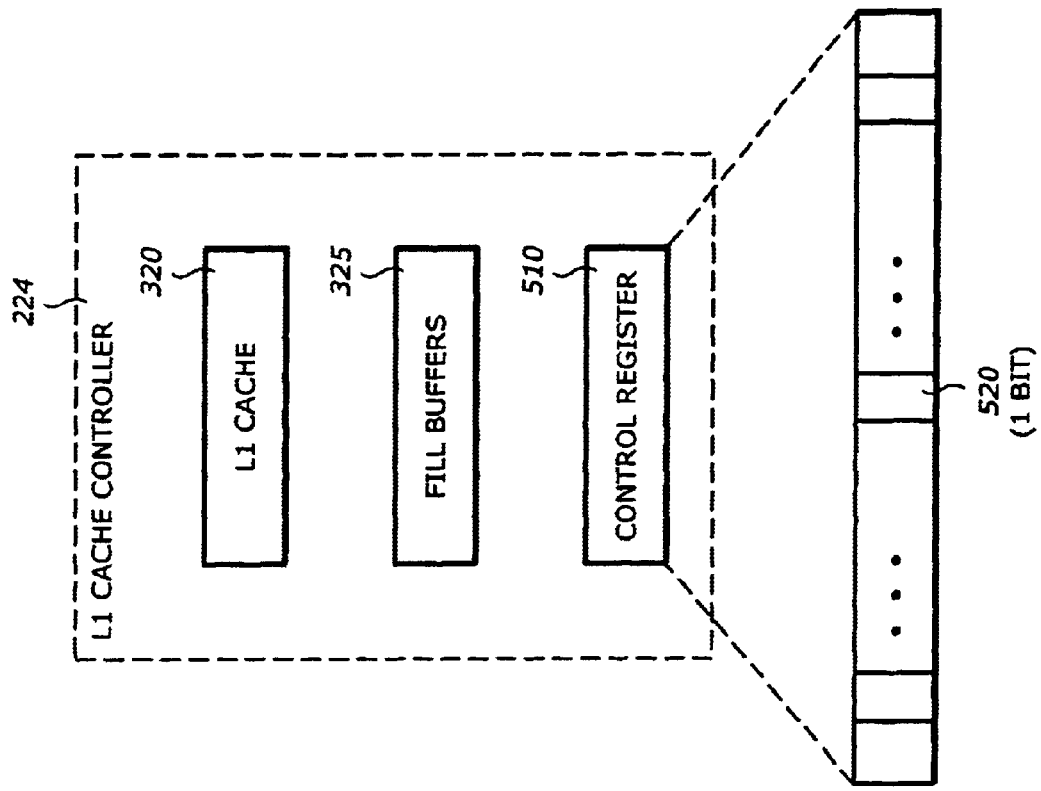
FIG. 5A illustrates a control register in the L1 cache controller which includes a mode bit, according to one embodiment of the invention.

For cacheable non-temporal prefetch instructions, the state of the Check L2 and Flush L2 bits are determined by a mode bit. The mode bit only has effect on non-temporal prefetch instructions. In another embodiment, serial or parallel lookup may be chosen with a similar mode bit for other instruction types. The location of the serial/parallel lookup mode bit is a matter of design choice. For example, in a first embodiment, as shown in FIG. 5A, the mode bit 520 occupies one of a plurality of bits in a control register 510 located in the L1 cache controller 235. In a second exemplary embodiment, as shown in FIG. 5B, the mode bit 560 occupies one of a plurality of bits in a control register 550 located in the bus controller 245. If the mode bit is a zero, the Check L2 and Flush L2 bits will be 1 and 0, respectively (i.e., serial lookup). If the mode bit is a one, the Check L2 and Flush L2 bits will be 0 and 1, respectively (i.e., parallel lookup). In one implementation, the mode bit 520 is hard coded in a non-user visible control register and is unchangeable for the life of the processor.

In another implementation, the mode bit 520 is in a user visible control register where a user can change its value through software. This implementation may be more advantageous because it allows a user, through software, to control whether to perform a serial or parallel lookup. For example, when a program reads data from memory for the first time, a parallel lookup is preferred because the data will most probably not be in the L2 cache, thereby saving clock cycles. Conversely, if data is likely to be in the L2 cache, serial lookup is preferred.

In one embodiment, cacheable temporal prefetch instructions do not attempt to minimize cache pollution. Rather, temporal prefetch instructions bring data to all cache levels in the cache hierarchy, above and including the one targeted by the prefetch instruction "hint". For example, a L1 cacheable prefetch brings data to both the L1 cache and L2 cache (assuming a two cache-level hierarchy). If the data is already found in the L1 cache, the cacheable prefetch instruction is retired and treated as a NOP and ignored by the L1 cache controller 235. On a L1 cacheable prefetch instruction (i.e., D/H="010") which misses the L1 cache, a fill buffer is allocated and issues a request the bus controller 245 as a regular cacheable L1 load "miss". The bus controller 245 checks the L2 cache 130. If the data is in the L2 cache 130, the line of data is sent back to the fill buffer 325 which places the data in the L1 cache 320. Otherwise, the data is fetched from external memory 140 and brought to the L2 cache 130 and the fill buffer 325. The fill buffer 325 forwards the line of data to the L1 cache 320.

In a L2 cacheable prefetch instruction (i.e., D/H="100"), if the data is found in the L1 cache, the instruction is retired and the L1 cache controller 235 treats the instruction as a NOP. On a L1 load "miss", a fill buffer 325 is allocated and a request is issued to the bus controller 245 as a regular L1 load "miss". Since the instruction is a L2 cacheable instruction, the RepEn 460 bit (FIG. 4D) is reset to indicate that the L1 cache 320 will not be updated. If the data is found in the L2 cache 130, then the instruction retired without updating L1 cache. If the data is not in the L2 cache, then it is retrieved from external memory 140 and placed in the L2 cache 130 and the fill buffer 325. This data is not forwarded to the L1 cache 320 since the RepEn bit is zero.

However, there are situations where the RepEn bit 460 changes from a zero to a one on a L2 cacheable prefetch instruction, during the life of the fill buffer 325, such that the data returned back to the fill buffer 325 is placed in the L1 cache 130. First, the RepEn bit is "flipped" from a zero to a one when the fill buffer 325, which is servicing a L2 cacheable prefetch, is globally observed in the E state and an incoming cacheable store from the MOU store buffers 310 targets the same cache line being serviced by the L2 prefetch. In this case, the cacheable store instruction writes data (e.g., one, two, four, eight bytes) from the processor core 208 to the corresponding bytes in the fill buffer 325 and changes the state of the fill buffer to M state. Once the bus controller brings the line of data to the fill buffer, only the bytes not written to on the store instruction are merged with the fill buffer. Thereafter, the line of data in the fill buffer is placed in the L1 cache 320 and the fill buffer is deallocated. In one embodiment, global observation occurs when the line of data (1) is found in the L2 cache, (2) is found in a cache of another processor (in the case of a multi-processor system), or (3) when the line is neither found in the L2 cache nor in a cache of another processor (i.e., the data is in external memory). Global observation occurs before the data is sent back to the fill buffer 325 from the bus controller 245.

Second, the RepEn bit is "flipped" from a zero to a one when the fill buffer 325, which is servicing a L2 cacheable prefetch, is globally observed, and an incoming cacheable load in the MOU load buffers 305, which is not a L2 prefetch itself, targets the same cache line being serviced by the L2 prefetch. For the incoming cacheable load instruction to complete, the data requested needs to be back from the bus controller 245 and in the fill buffer 325. If the data is not yet available, the incoming load is blocked. However, the RepEn bit will still be set. Upon return of the requested data from the bus controller 245, the blocked load is re-issued, and the desired data is forwarded from either the fill buffer 325 or the L1 cache 320 (if the fill buffer has already been deallocated) to the processor core 208.

Figure 6B:
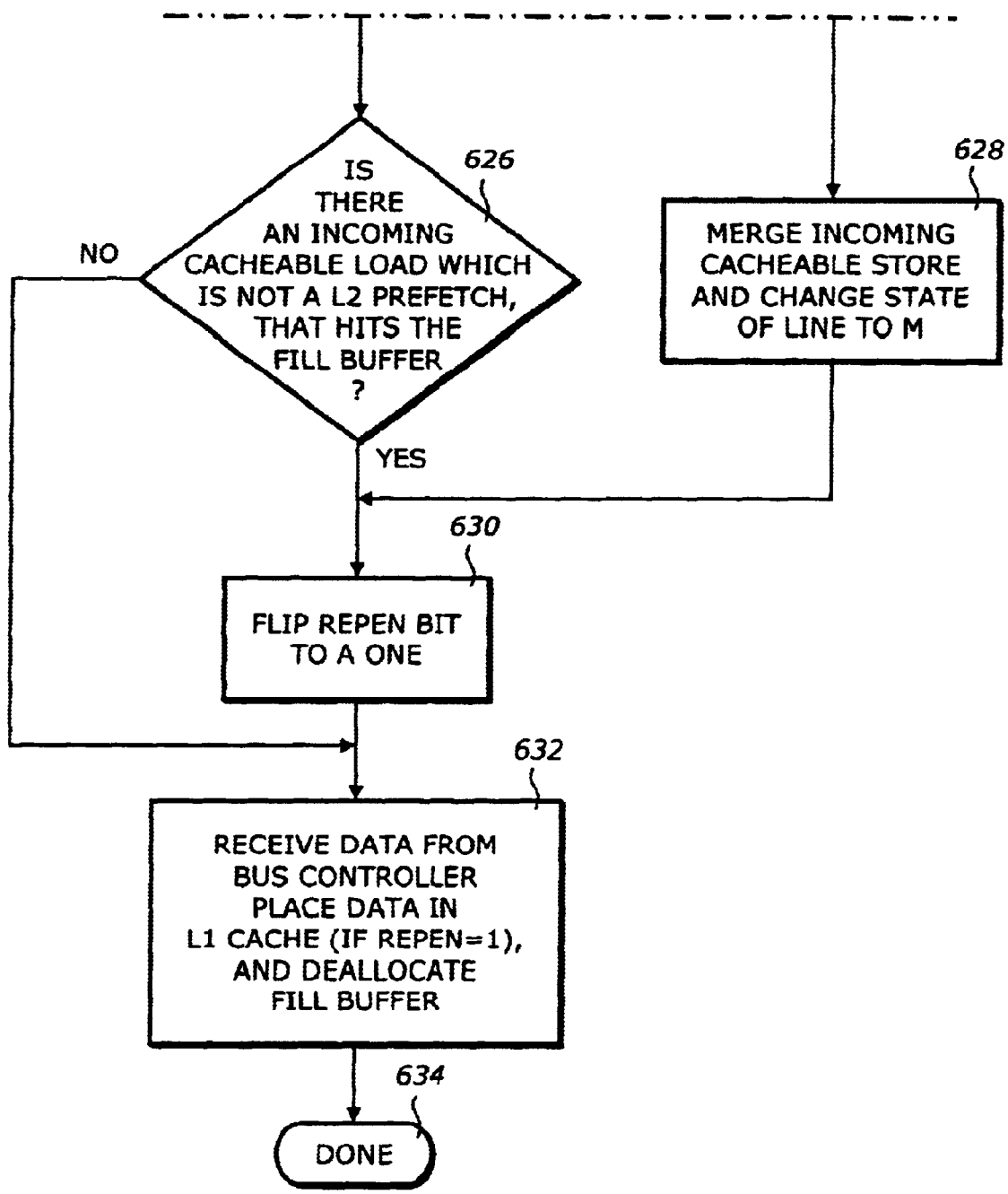

FIG. 6 is a flow chart illustrating an exemplary process 600 of modifying a replace enable bit on a fill buffer which is servicing a L2 cacheable prefetch "miss". Referring to FIG. 6, the process 600 commences at block 602 where an incoming cacheable load is detected. The process then proceeds to block 604 where a determination is made as to whether the load "hits" the L1 cache. If there is a L1 cache "hit", the process moves to block 606 where it ends. If, on the other hand, there is a L1 "miss", the process continues to block 608 where a determination is made as to whether the load is a L2 cacheable prefetch. If the load is not a L2 cacheable prefetch, the process moves to block 610 where a fill buffer is allocated and the RepEn bit is set. The process then moves to block 612 where the fill buffer issues a bus request to the bus controller to retrieve the data from the L2 cache or external memory and places the data in the L1 cache when the data is returned from the bus controller 245 (the fill buffer is then deallocated). The process then ends at block 614.

However, if at block 608, the load is a L2 cacheable prefetch, the process proceeds to block 616 where a fill buffer is allocated and the RepEn bit is reset. The process continues to block 618 where a bus request is issued to the bus controller 245. At block 620, the fill buffer gets global observation. At block 622, the process determines the state of the fill buffer. If the fill buffer is in the E state, the process moves to block 624, otherwise, if the fill buffer is in the S state, the process moves to block 626. At block 624, a determination is made as to whether a subsequent incoming cacheable store "hits" the fill buffer. If the incoming cacheable store does not "hit" the fill buffer, the process proceeds to block 626, otherwise the process moves to block 628. At block 628, the incoming store merges with the fill buffer and updates the line to M state. The process then continues to block 630.

At block 626 a determination is made as to whether a subsequent incoming load, which is not a L2 prefetch, "hits" the fill buffer. If not, the process moves to block 632. If there is an incoming load, which is not a L2 prefetch, that "hits" the fill buffer, the process moves to block 630 where the RepEn bit is "flipped" from a zero to a one. At block 632, when the data is retrieved from the bus controller 245, the data is placed in the L1 cache (if the RepEn bit is flipped) and the fill buffer is deallocated. If at block 632, the bus controller has not returned the line of data to the fill buffer, the process 600 may execute blocks 622 to 632 several times until such time that the data is received by the fill buffer. The process then ends at block 634.

DATA FLOW FOR SERIAL/PARALLEL LOOKUP

FIGS. 7 through 9 illustrate several exemplary scenarios for cacheable non-temporal prefetches. In these Figures, a broken arrow indicates an address/control path while a solid arrow indicates a data path. The Figures show a sequence of steps which are numbered. Typically, the numbers represent the order of the sequence. In FIGS. 7 through 9, it is assumed that all loads "miss" the L1 cache. Moreover, in FIGS. 7 through 9, the fill buffer issues a request to the bus controller and the data is returned to the fill buffer.

Figure 7B:
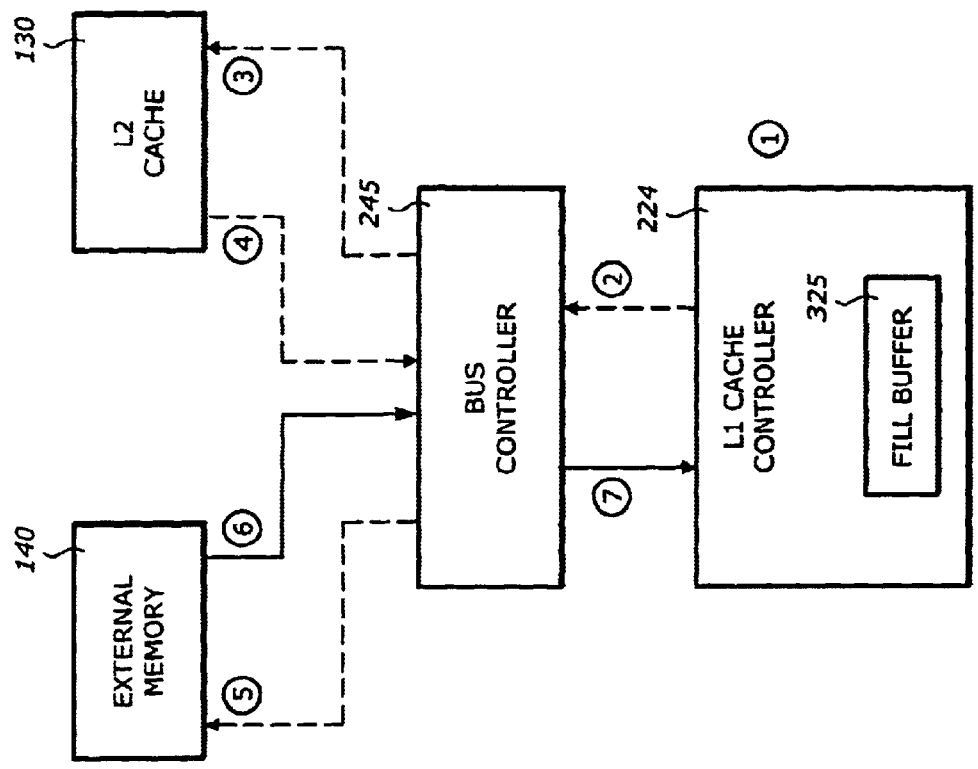
FIG. 7B illustrates an exemplary data flow for a serial lookup with a L2 "miss" on a non-temporal prefetch that "missed" the L1 cache, according to one embodiment of the invention.
Figure 7A:
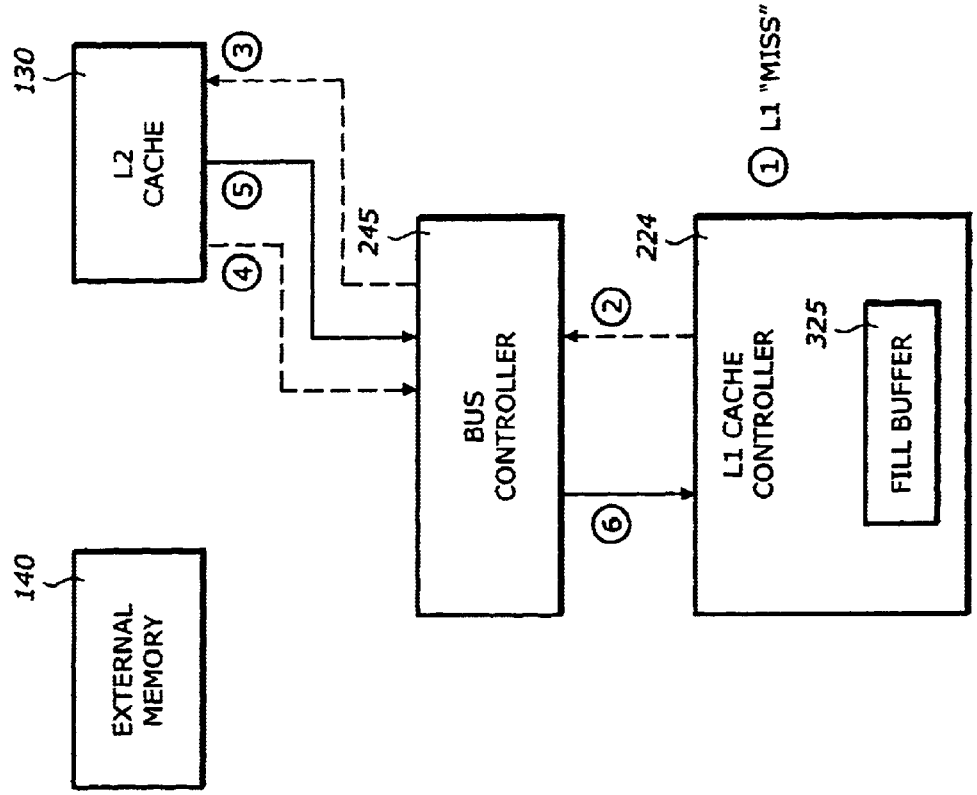
FIG. 7A illustrates an exemplary data flow for a serial lookup with a L2 "hit" on a non-temporal prefetch that "missed" the L1 cache, according to one embodiment of the invention.

FIG. 7A illustrates an exemplary data flow for a serial lookup with a L2 "hit" on a non-temporal prefetch. On an L1 "miss" at Step 1, a fill buffer issues a bus request to check the L2 cache 130 (Step 2). At Step 3, the bus controller 245 checks to see if the data is in the L2 cache 130. At Step 4, the L2 cache 130 indicates a L2 "hit" and returns the line of data to the bus controller 245 (Step 5). At Step 6, the bus controller 245 returns the line of data to the fill buffer in the L1 cache controller 235. The fill buffer then places the data in the L1 cache.

FIG. 7B illustrates an exemplary data flow for a serial lookup with a L2 "miss" on a non-temporal prefetch. Steps 1, 2, and 3 are the same as for FIG. 7A. At Step 4, the L2 cache 130 indicates a L2 "miss". At Step 5, the bus controller 245 requests for the line of data from external memory 140. At Step 6, the line of data is returned from external memory to the bus controller 245 which in turn sends the line off data to the fill buffer of the L1 cache controller 235 (Step 7). The fill buffer then places the data in the L1 cache.

Figure 8B:
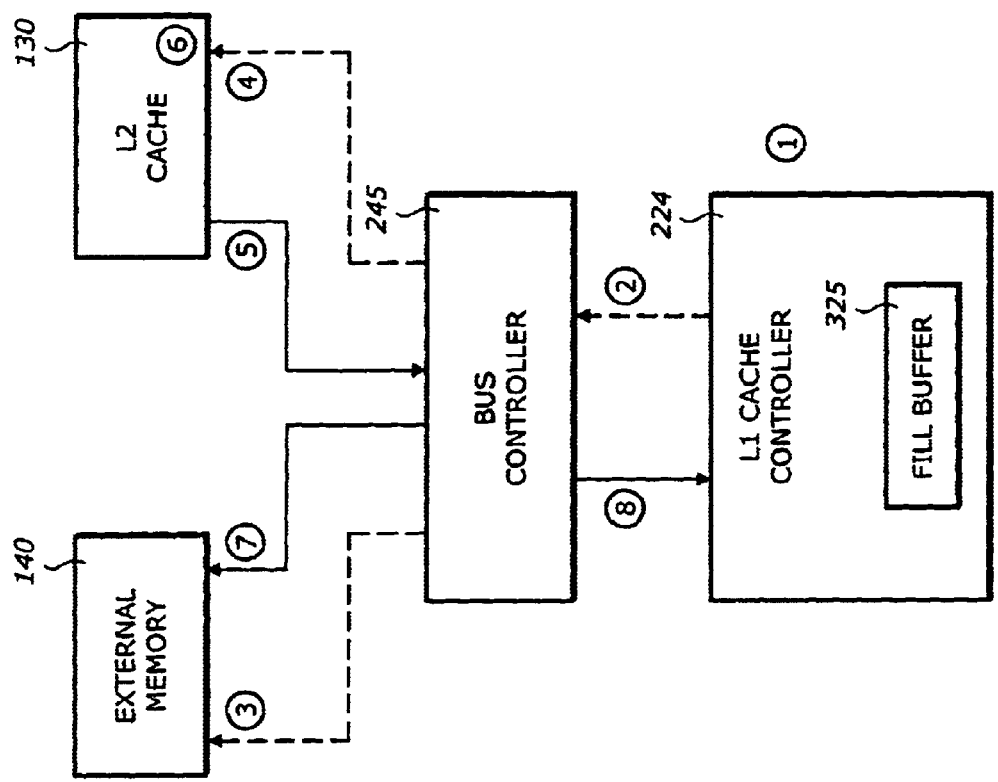
FIG. 8B illustrates an exemplary data flow for a parallel lookup with a L2 "hit" on an M line on a non-temporal prefetch that "missed" the L1 cache, according to one embodiment of the invention.
Figure 8A:
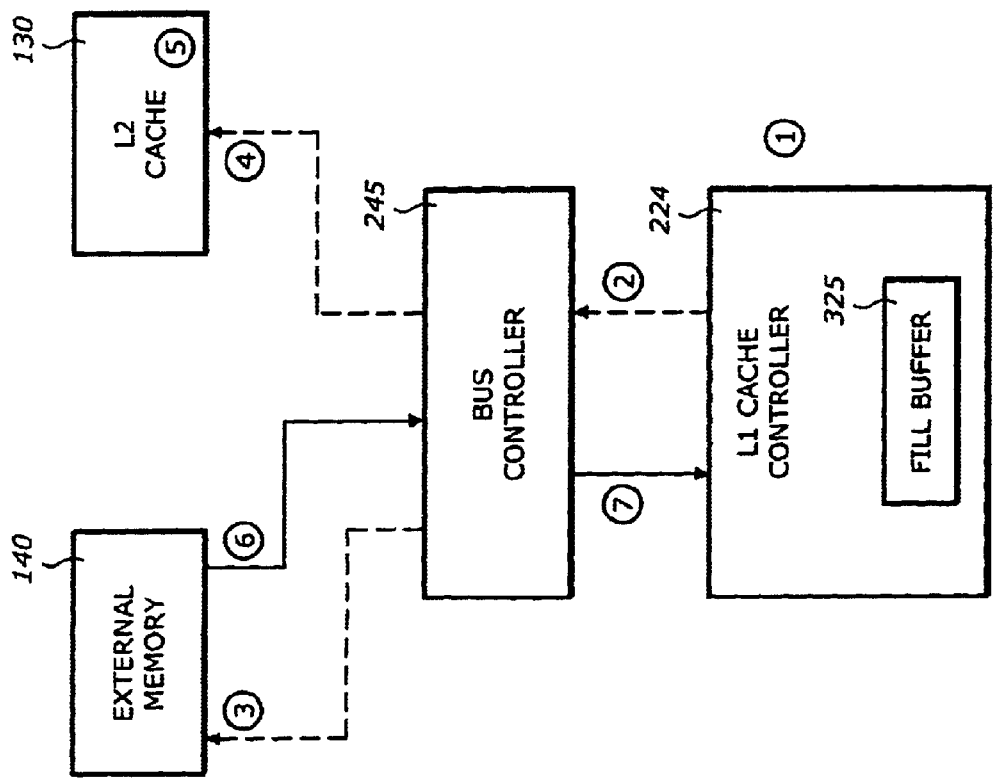
FIG. 8A illustrates an exemplary data flow for a parallel lookup with a L2 "hit" on an E/S line on a non-temporal prefetch that "missed" the L1 cache, according to one embodiment of the invention.

FIG. 8A illustrates an exemplary data flow for a parallel lookup with a L2 "hit" on an E/S line on a non-temporal prefetch. On an L1 "miss" at Step 1, the fill buffer 325 issues a bus request to check external memory 140 for the line of data (Step 2). At Step 3, the bus controller 245 requests the line of data from external memory 140. At Step 4, the bus controller 245 "snoops" the L2 cache to determine whether the data is in the L2 cache 130. If the line is in L2 cache 130 and it is in E or S state, the line is invalidated (Step 5). At Step 6, the line is returned from external memory to the bus controller. At Step 7, the bus controller 245 returns the line of data to fill buffer 325 of the L1 cache controller 235. The fill buffer then places the data in the L1 cache.

FIG. 8B illustrates an exemplary data flow for a parallel lookup with a L2 "hit" on an M line on a non-temporal prefetch. Steps 1 through 4 are the same as for FIG. 8A. If the line is in L2 cache 130 and it is in the M state, then the line is returned to the bus controller 245 and invalidated in the L2 cache (Steps 5 and 6). The bus controller 245 writes the line of data to external memory 140 (Step 7) and then to the fill buffer 325 (Step 8) (or vise versa). The fill buffer then places the data in the L1 cache. The globally observed state of the line which ends up in the L1 cache is E, for a non-temporal prefetch with a write back memory type or S for a write-through memory type.

FIG. 9A illustrates an exemplary data flow for a L2 cacheable prefetch that "misses" the L1 cache and "hits" the L2 cache. On a L1 "miss" at Step 1, the fill buffer 325 issues a bus request to check the L2 cache 130 for the line of data (Step 2). At Step 3, the bus controller 245 requests the line of data from the L2 cache 130. At Steps 4 and 5, the L2 cache 130 indicates a L2 "hit" and returns the line of data to the bus controller 245. At Step 6, the bus controller 245 returns the line of data to the fill buffer 325. Subsequent to Step 2, if there is a cacheable request (load or store), which is not itself a L2 prefetch, to the same line of data, the fill buffer 325, upon receipt of the line of data from the bus controller 245, places the line of data in the L1 cache 320, otherwise the line of data is discarded and the fill buffer is deallocated.

FIG. 9B illustrates an exemplary data flow for a L2 cacheable prefetch that "misses" both the L1 and L2 caches. Steps 1 through 3 are the same as described with respect to FIG. 9A. At Step 4, the L2 cache 130 indicates a "miss" which causes the bus controller 245 to request the line of data from external memory 140 (Step 5). The line of data is retrieved from external memory (Step 6), placed in the L2 cache (Step 7), and forwarded to the fill buffer 325 (Step 8). Subsequent to Step 2, if there is a cacheable request, which is not itself a L2 prefetch, to the same line of data, the fill buffer 325, upon receipt of the line of data from the bus controller 245, places the line of data in the L1 cache 320, otherwise the line of data is discarded. L1 cacheable prefetches that "miss" the L1 cache but "hit" and "miss" the L2 cache behave similar to FIGS. 9A and 9B, respectively, except that the data returned to the fill buffer is always placed in the L1 cache (the last Step in each Figure).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
   a higher level cache associated with a buffer having a control field and a lower level cache;
   a decoder to decode instructions; and
   a circuit coupled to the decoder, said circuit in response to a single decoded instruction corresponding to a cacheable request to retrieve data from external memory and not forward the retrieved data to the higher level cache upon a higher level cache miss based on the control field.

2. The apparatus of claim 1 wherein the single decoded instruction is a prefetch instruction.

3. The apparatus of claim 1 wherein the higher level cache is contained in a processor and the lower level cache is external to said processor.

4. The apparatus of claim 1 wherein both the higher level cache and the lower level cache are contained in a processor.

5. The apparatus of claim 1 wherein said circuit is a cache controller.

6. An apparatus comprising:
   a higher level cache associated with a buffer having a control field and a lower level cache; and
   a circuit in response to a cacheable request to retrieve data from external memory and not forward the retrieved data to the higher level cache upon a higher level cache miss based on said control field.

7. The apparatus of claim 6 wherein the higher level cache is contained in a processor and the lower level cache is external to said processor.

8. The apparatus of claim 6 wherein both the higher level cache and the lower level cache are contained in a processor.

9. The apparatus of claim 6 wherein said circuit is a cache controller.

10. The apparatus of claim 6 wherein said data is user selectable.

11. An apparatus comprising:
    a higher level cache associated with a buffer having a control field and a lower level cache;
    a decoder to decode instructions; and
    a circuit coupled to the decoder, said circuit in response to a first decoded instruction corresponding to a cacheable request to
    issue a request to retrieve data at an address from external memory to place said data only in the lower level cache based on the control field, and
    place said data in said higher level cache upon detection of a second decoded instruction to said address, the second decoded instruction being a higher level cacheable instruction.

12. The apparatus of claim 11 wherein the first decoded instruction is a prefetch instruction to the lower level cache.

13. The apparatus of claim 11 wherein the second decoded instruction is a cacheable load instruction to said address.

14. The apparatus of claim 11 wherein said circuit is a cache controller.

15. An apparatus comprising:
    a higher level cache associated with a buffer having a control field and a lower level cache;
    a decoder to decode instructions; and
    a circuit coupled to the decoder, said circuit in response to a first decoded instruction corresponding to a cacheable request to
    allocate said buffer and issue a request to retrieve data at an address from external memory and place said data only in the lower level cache based on the control field,
    retrieve said data from said buffer, and
    place said data in the higher level cache upon detection of a second cacheable decoded instruction to said address, the second cacheable decoded instruction being a higher level cacheable instruction.

16. The apparatus of claim 15 wherein the first decoded instruction is a prefetch instruction to the lower level cache.

17. The apparatus of claim 15 wherein the second decoded instruction is a cacheable load instruction to said address.

18. A method, comprising:
    decoding a first instruction corresponding to a cacheable request to at least one of a lower level cache and a higher level cache, the higher level cache being associated with a buffer having a control field;
    allocating said buffer to issue a request to retrieve data at an address in external memory to place said data only in the lower level cache based on the control field;
    receiving said data in said buffer;
    detecting a second instruction to said address; and
    placing said data in the higher level cache, the second instruction being a higher level cacheable instruction.

19. The method of claim 18 wherein decoding a first instruction comprises decoding a prefetch instruction to the lower level cache.

20. The method of claim 18 wherein detecting a second instruction to said address comprises detecting a cacheable load instruction to said address.

* * * * *

UNITED STATES PATENT AND TRADEMARK OFFICE
CERTIFICATE OF CORRECTION

PATENT NO. : 6,643,745 B1
DATED : November 4, 2003
INVENTOR(S) : Palanca et al.

It is certified that error appears in the above-identified patent and that said Letters Patent is hereby corrected as shown below:

<u>Column 12,</u>
Line 10, delete "off" and insert -- of --.

Signed and Sealed this

Second Day of March, 2004

JON W. DUDAS
*Acting Director of the United States Patent and Trademark Office*